(No Model.)

15 Sheets—Sheet 2.

B. J. ABBOTT.
HORSE NAIL MACHINE.

No. 587,029. Patented July 27, 1897.

WITNESSES:

INVENTOR:
BENJAMIN JUDD ABBOTT
BY Munday, Evarts & Adcock.
HIS ATTORNEYS.

(No Model.) 15 Sheets—Sheet 5.

B. J. ABBOTT.
HORSE NAIL MACHINE.

No. 587,029. Patented July 27, 1897.

WITNESSES: Sew. E. Curtis, H. W. Munday

INVENTOR: Benjamin Judd Abbott
By Munday, Evarts & Adcock.
HIS ATTORNEYS.

(No Model.) 15 Sheets—Sheet 6.
B. J. ABBOTT.
HORSE NAIL MACHINE.
No. 587,029. Patented July 27, 1897.
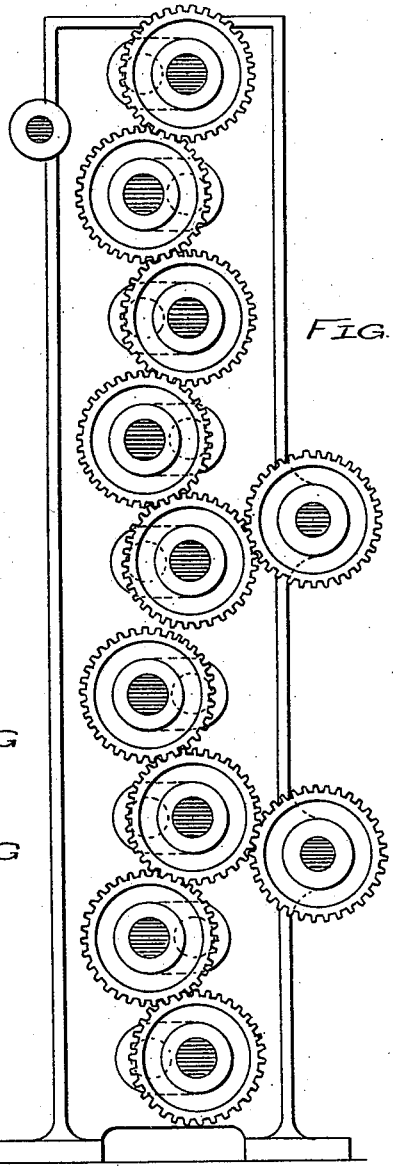
FIG. 6.
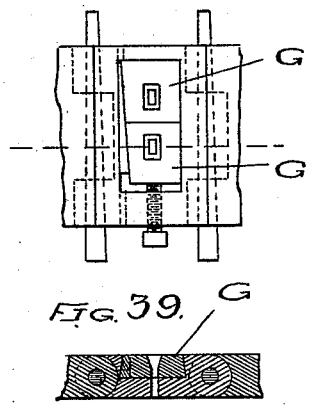
FIG. 38.
FIG. 39.
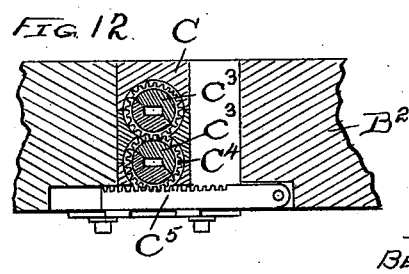
FIG. 12.
WITNESSES:
Sew. C. Curtis
H. W. Munday
INVENTOR:
BENJAMIN JUDD ABBOTT
BY Munday, Evarts & Adcock.
HIS ATTORNEYS.
THE NORRIS PETERS CO., PHOTO-LITHO., WASHINGTON, D. C.

(No Model.)
B. J. ABBOTT.
HORSE NAIL MACHINE.
No. 587,029. Patented July 27, 1897.
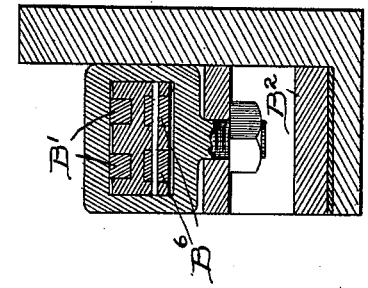
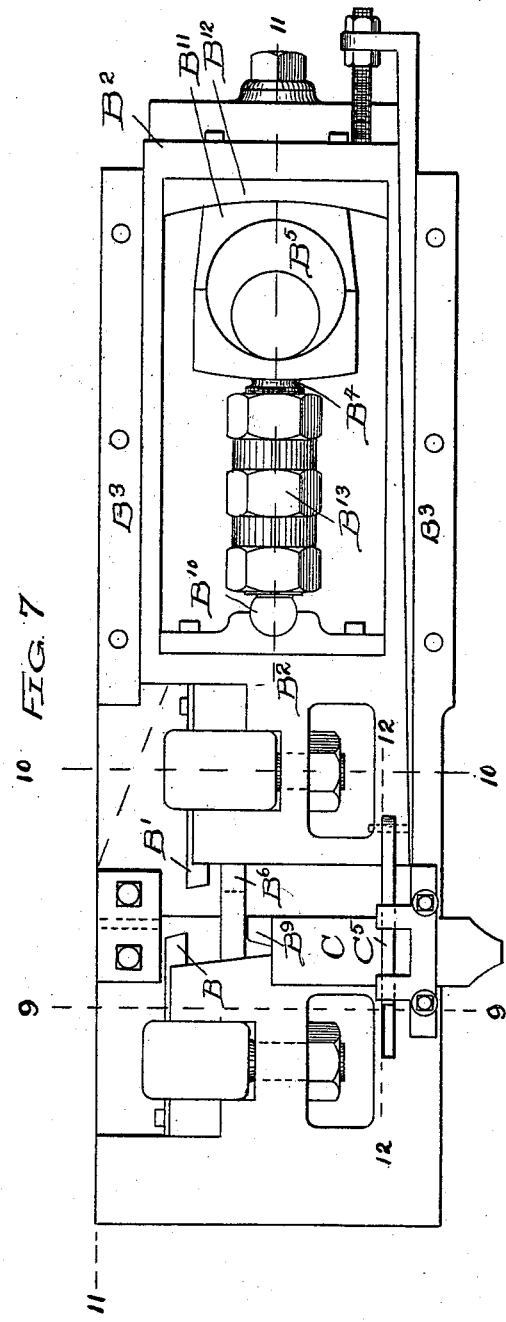
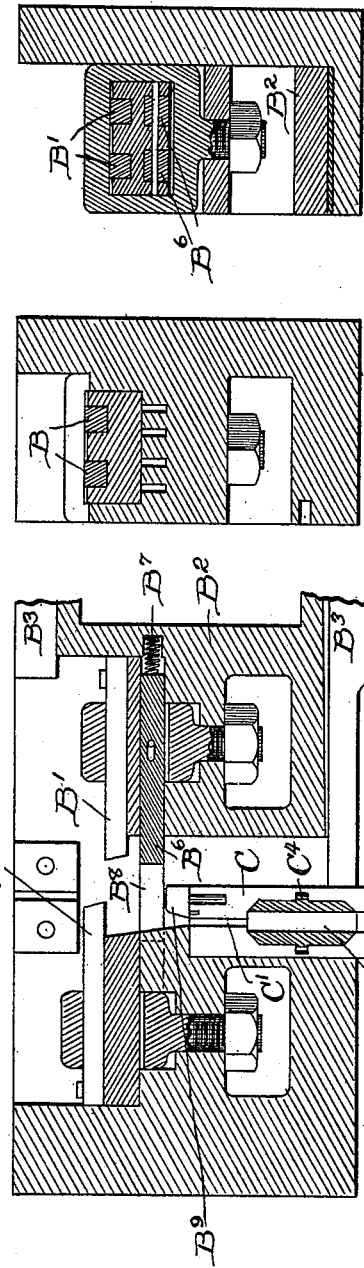
WITNESSES:
INVENTOR:
BENJAMIN JUDD ABBOTT
BY Munday, Evarts & Adcock,
HIS ATTORNEYS.

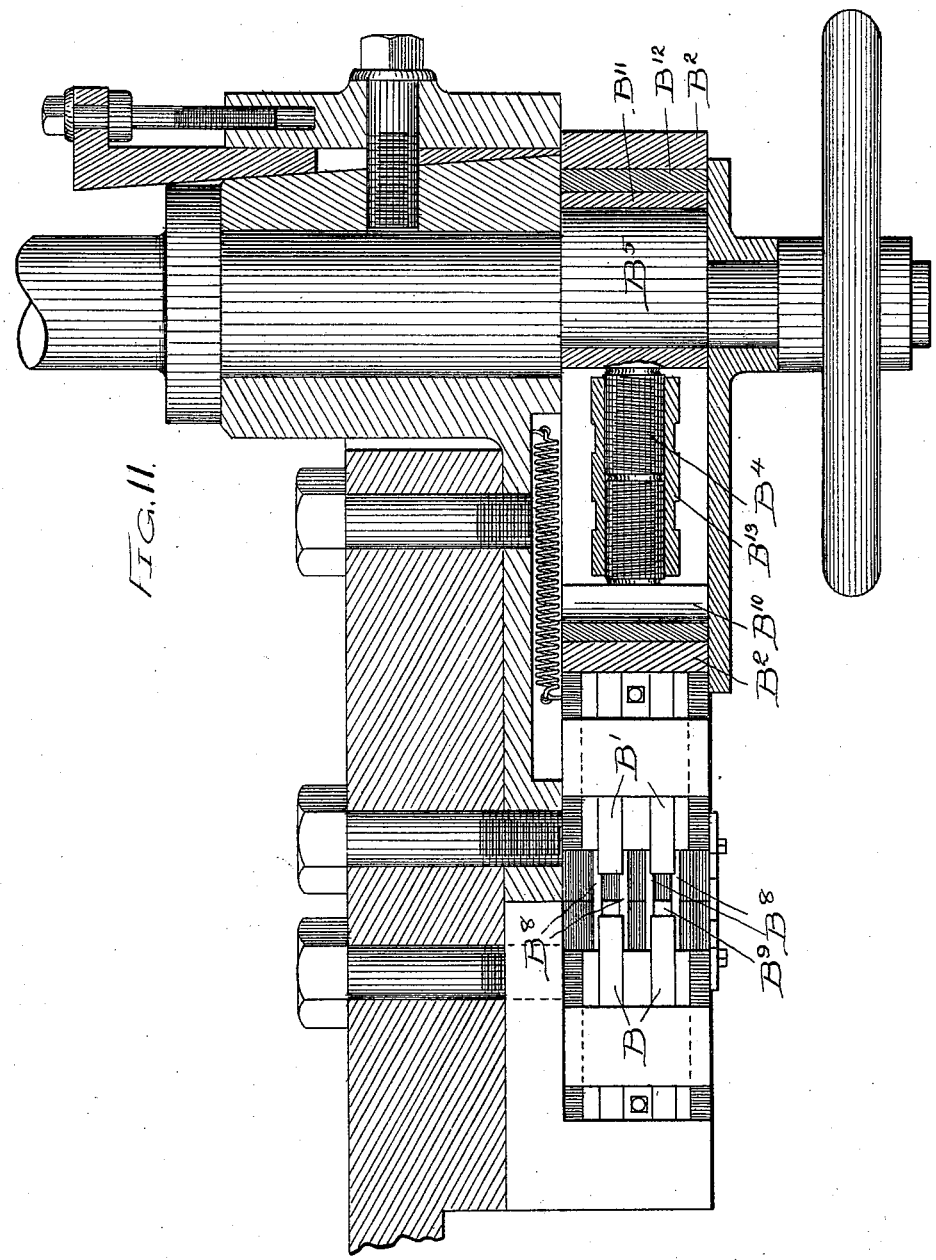

(No Model.) 15 Sheets—Sheet 9.

B. J. ABBOTT.
HORSE NAIL MACHINE.

No. 587,029. Patented July 27, 1897.

WITNESSES:

INVENTOR:
BENJAMIN JUDD ABBOTT
BY Munday, Evarts & Adcock
HIS ATTORNEYS.

(No Model.) 15 Sheets—Sheet 10.

B. J. ABBOTT.
HORSE NAIL MACHINE.

No. 587,029. Patented July 27, 1897.

WITNESSES:
INVENTOR:
Benjamin Judd Abbott
By Munday, Evarts & Adcock.
HIS ATTORNEYS.

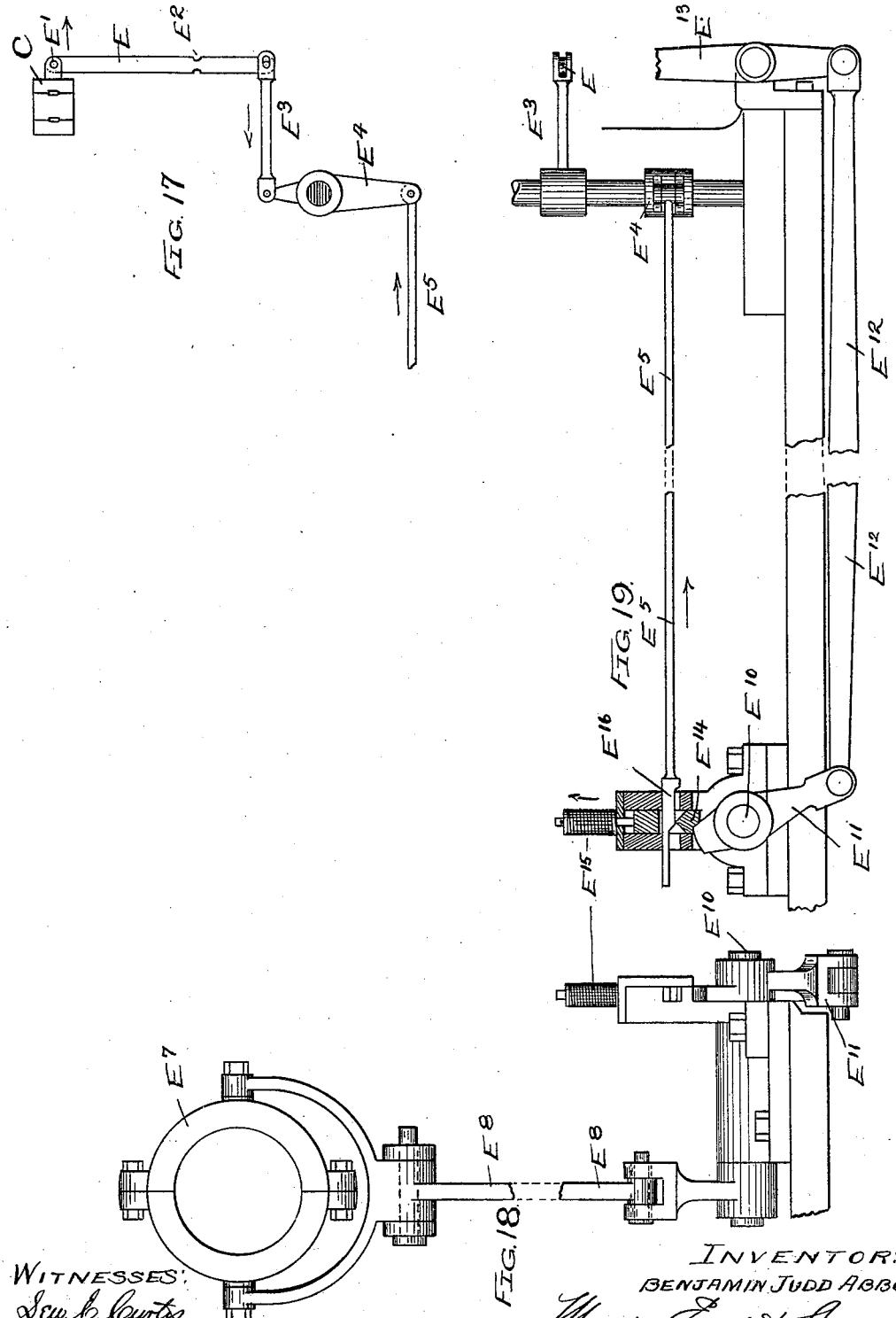

(No Model.) 15 Sheets—Sheet 12.

B. J. ABBOTT.
HORSE NAIL MACHINE.

No. 587,029. Patented July 27, 1897.

WITNESSES:
Sew. E. Curtis
H. W. Munday

INVENTOR:
BENJAMIN JUDD ABBOTT
BY Munday, Evarts & Adcock,
HIS ATTORNEYS.

THE NORRIS PETERS CO., PHOTO-LITHO., WASHINGTON, D. C.

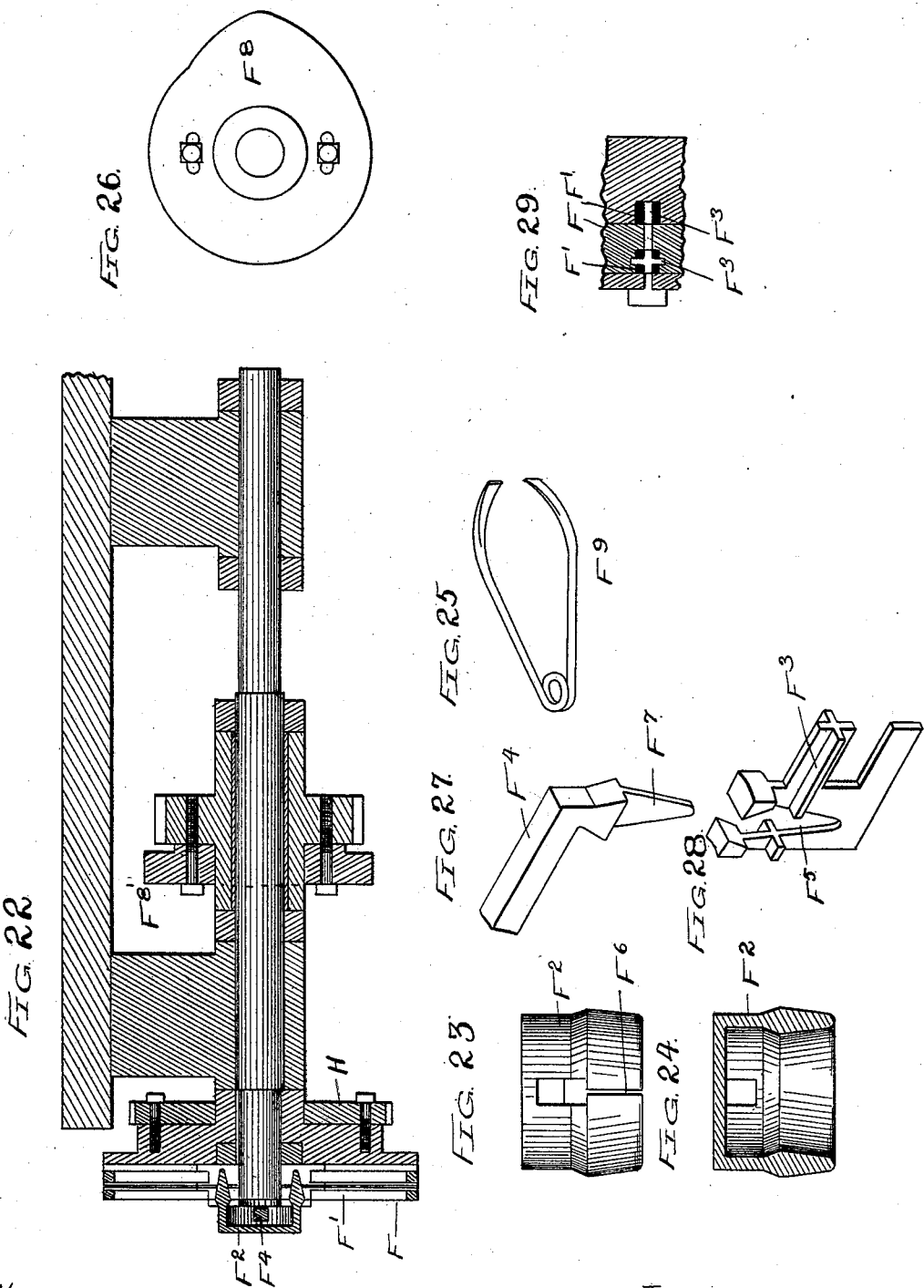

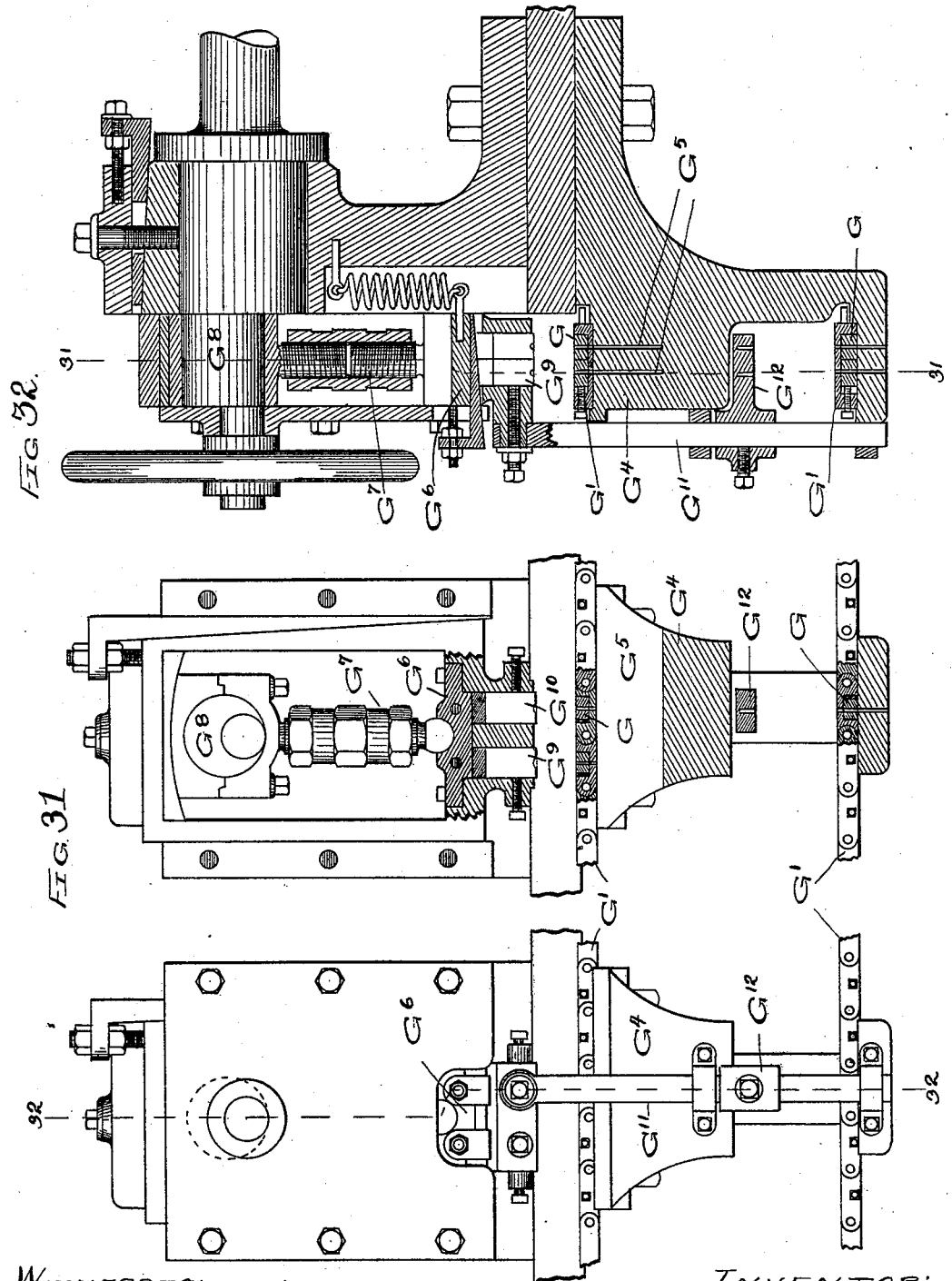

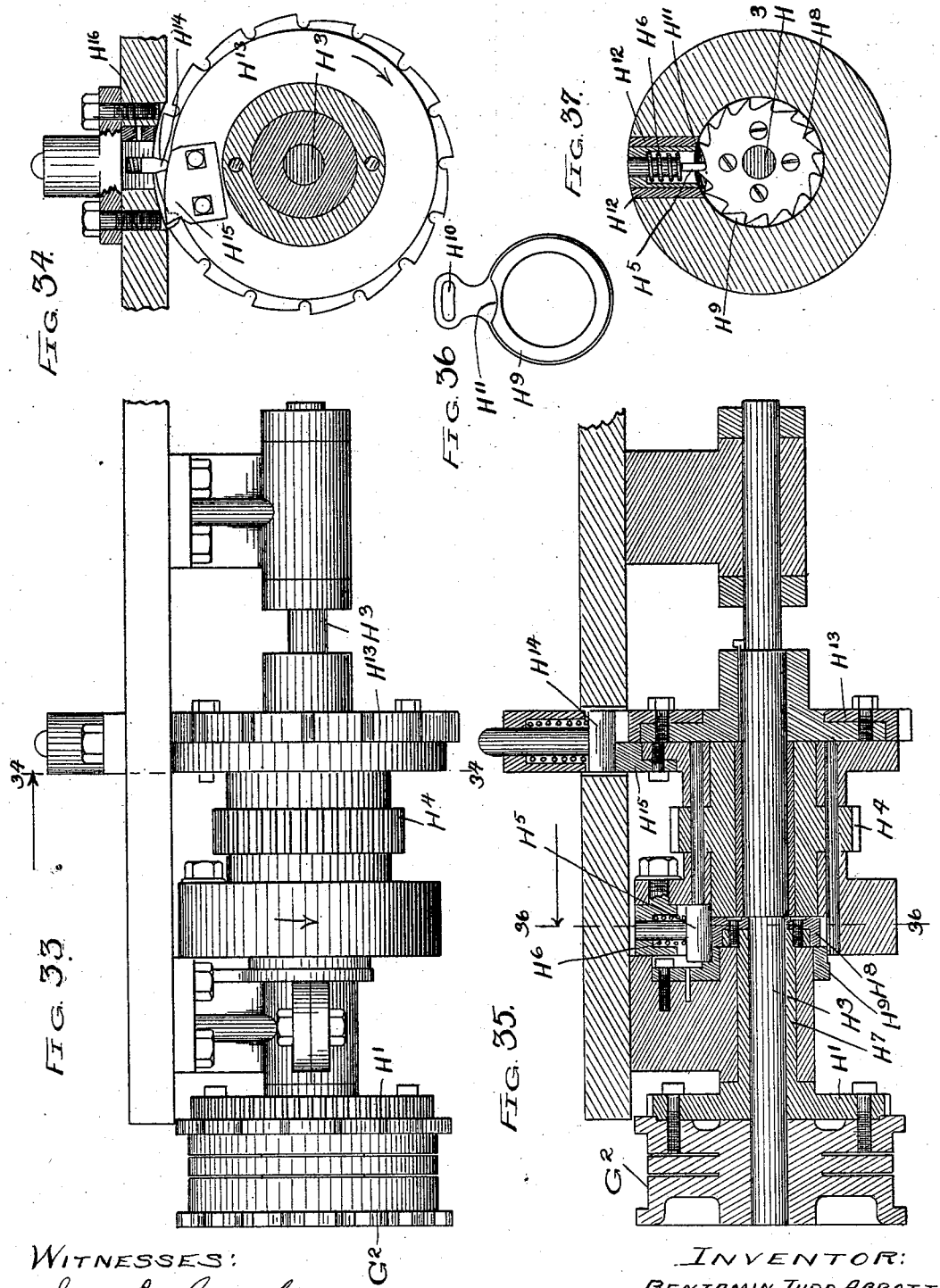

UNITED STATES PATENT OFFICE.

BENJAMIN JUDD ABBOTT, OF CHICAGO, ILLINOIS, ASSIGNOR TO CHARLES H. DURPHY, OF SAME PLACE.

HORSE-NAIL MACHINE.

SPECIFICATION forming part of Letters Patent No. 587,029, dated July 27, 1897.

Application filed February 23, 1897. Serial No. 624,567. (No model.)

*To all whom it may concern:*

Be it known that I, BENJAMIN JUDD ABBOTT, a citizen of the United States, residing in Chicago, in the county of Cook and State of Illinois, have invented a new and useful Improvement in Horse-Nail Machines, of which the following is a specification.

This invention relates to a machine for automatically forming horse-nail blanks from a continuous rod and delivering the same in a proper shape for the subsequent pointing and finishing.

The invention consists in the novel devices and novel combinations of parts and devices herein shown and described, and more particularly pointed out in the claims.

Figure 1:
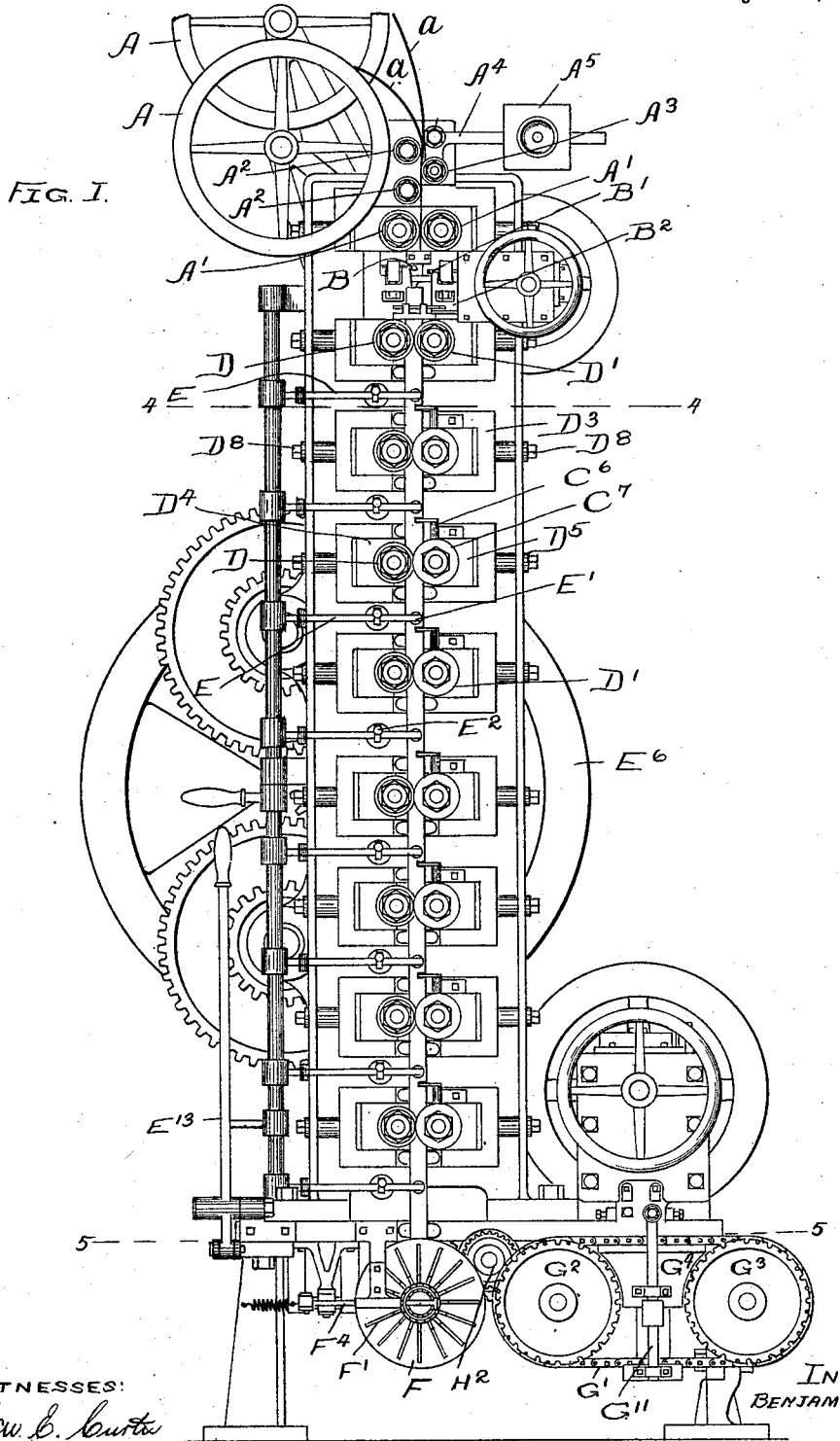
Figure 2:
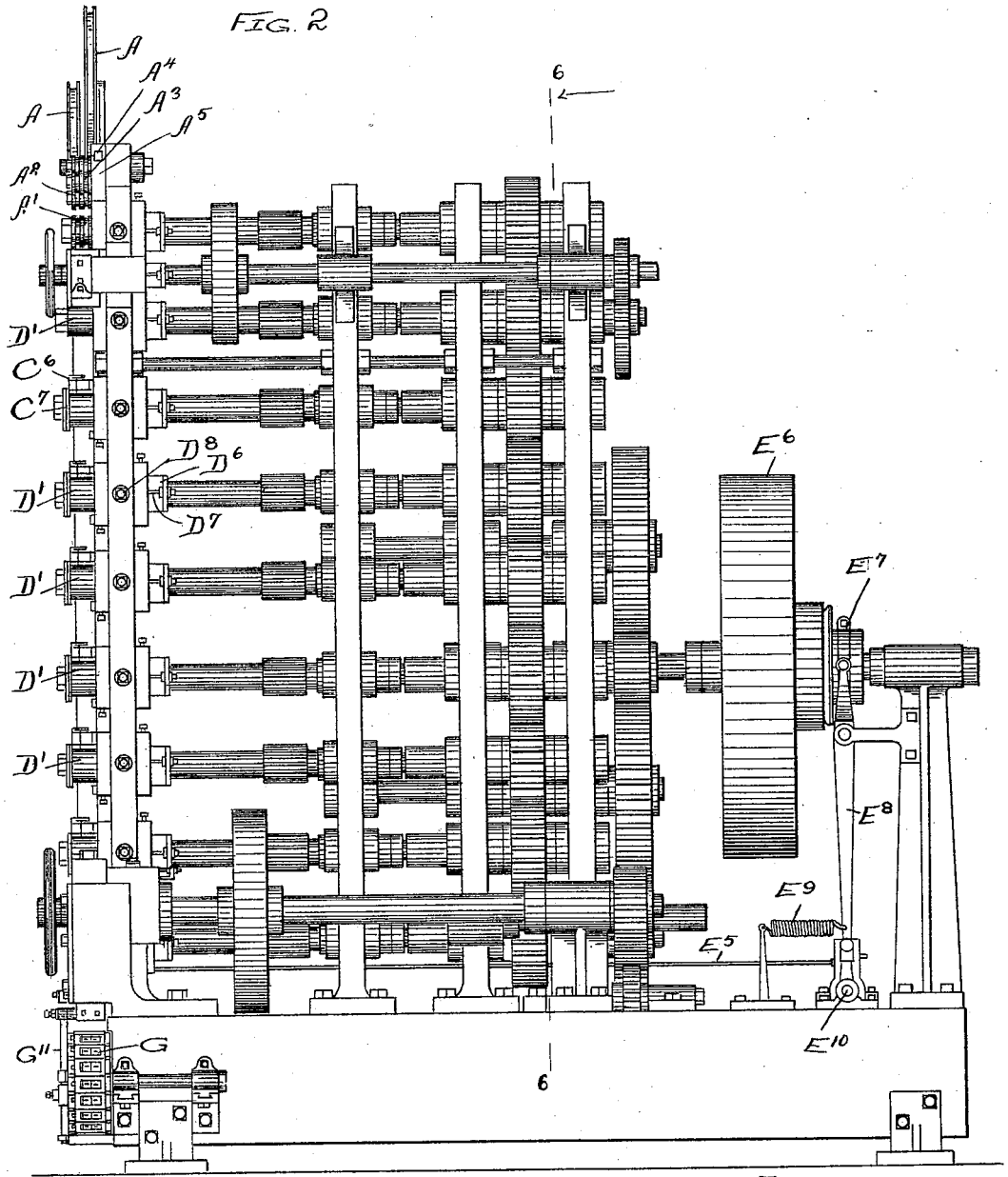
Figure 3:
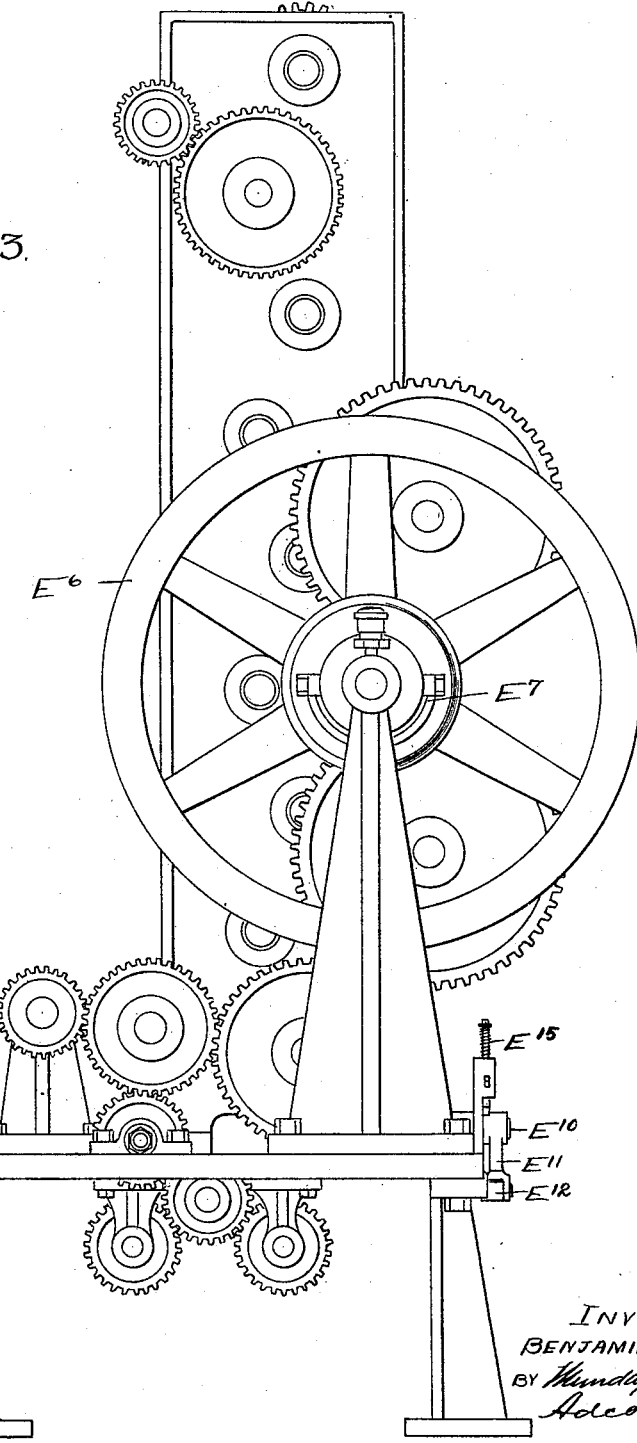
Figure 4:
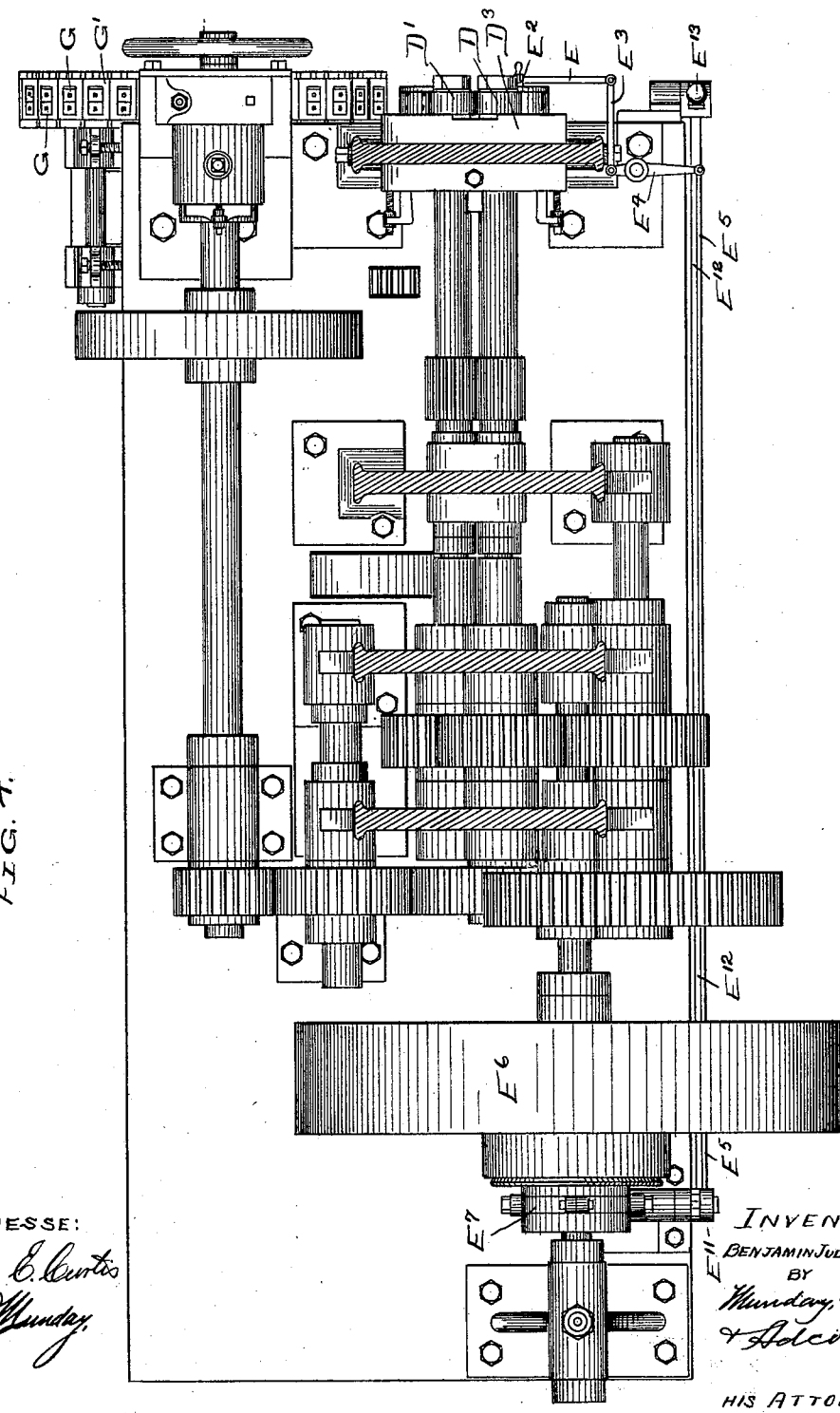
Figure 5:
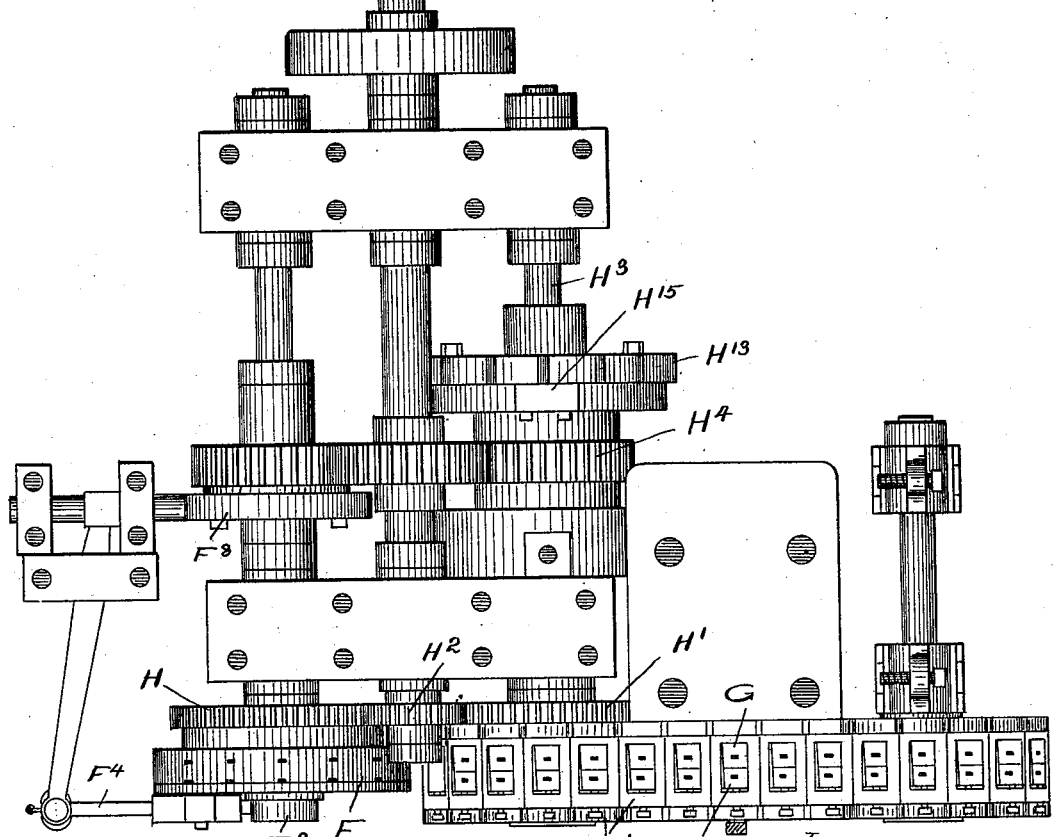
Figure 13:
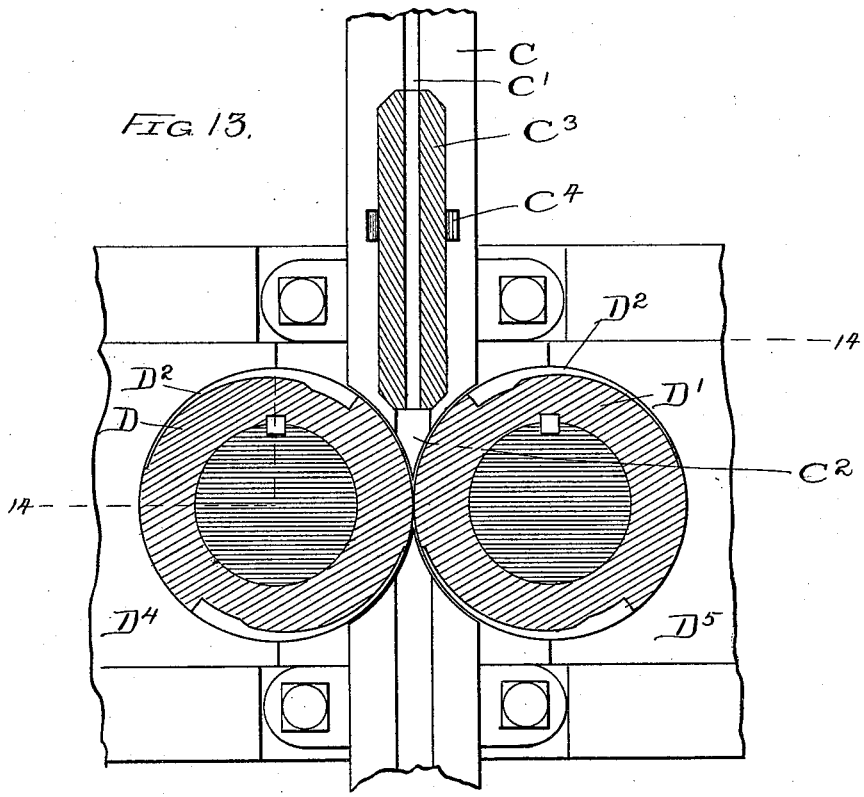
Figure 14:
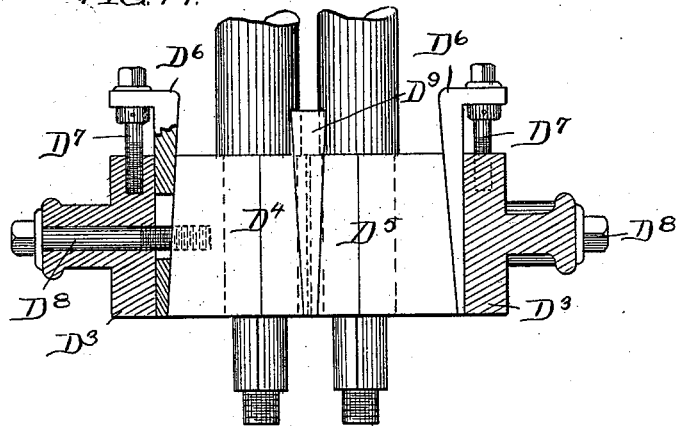
Figure 15:
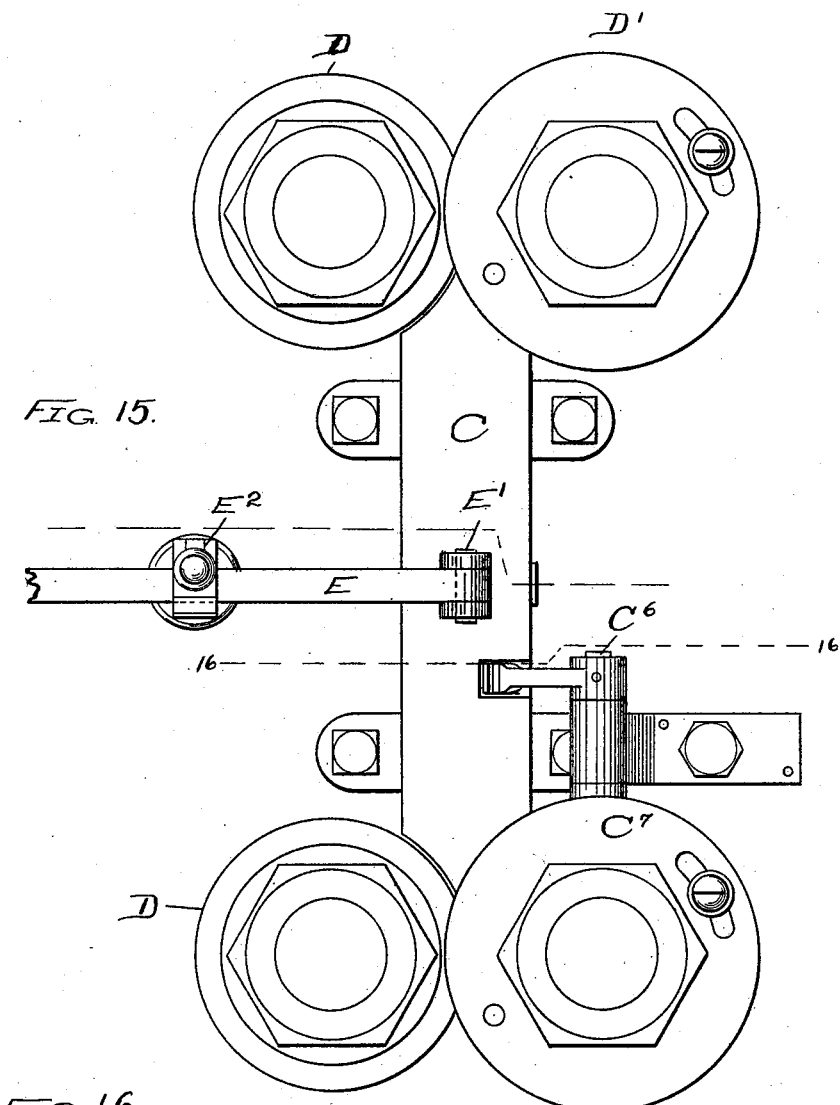

In the accompanying drawings, which form a part of this specification and in which similar letters of reference indicate like parts throughout the several views, Figure 1 is a front elevation of the machine. Fig. 2 is a side elevation of the same. Fig. 3 is a rear elevation of the machine. Fig. 4 is a horizontal section on the line 4 4 of Fig. 1. Fig. 5 is a sectional plan on the line 5 5 of Fig. 1. Fig. 6 is a section on the line 6 6 of Fig. 2. Fig. 7 is an enlarged elevation of the blank-cutters. Fig. 8 is a sectional view of a part of the same. Fig. 9 is a section on the line 9 9 of Fig. 7. Fig. 10 is a section on the line 10 10 of Fig. 7. Fig. 11 is a section on the line 11 11 of Fig. 7. Fig. 12 is a sectional view of the guide-tube and blank-cutting mechanism, taken on the line 12 12 of Fig. 7. Figs. 13, 14, 15, 16, 17, 18, and 19 are detail views illustrating the die-rolls, the feed-passages, and the stop mechanism connected therewith. Figs. 20, 21, 22, 23, 24, 25, 26, 27, 28, and 29 are details of the turn-plate mechanism. Figs. 30, 31, 32, 33, 34, 35, 36, 37, 38, and 39 are details of the heading-die.

It will be noticed that all of the several features and parts of the mechanism in this machine are so contrived and designed that those parts which operate upon the nail-rod or the blanks made therefrom may be multiplied in the machine without interference with their operation, so that not only one, but several, two or more, nail-rods may be fed at once into the machine, and the driving-gears, die-carrying parts, and other like parts of the machine are single. By this means without material increase in the size and cost of the machine its capacity may be vastly augmented. It will be noticed also as the description proceeds that the construction of the active parts is simple, so that these parts may be made both strong and durable.

In the machine chosen for illustration in the drawings the construction is one designed to operate upon two nail-rods simultaneously, the knives for severing the blanks from the rods, the forming-dies, and the heading mechanism being all duplicated. In like manner, if desired, these parts may be triplicated or quadrupled without any change in the structure otherwise.

In the said drawings, A A are the nail-rod reels, upon each of which is coiled a supply of nail-rod $a$.

$A'$ $A'$ is a pair of driven feed-rolls set close enough together to grip the nail-rods with sufficient force to pull the same from the reel. Interposed between the feed-rolls are three straightening-rolls, all of which are idlers, and two of which—viz., the rolls $A^2$ $A^2$—are placed one above the other, while the third roll $A^3$ stands midway between the other two and at one side. This third idler $A^3$ is mounted on the vertical arm of the bell-crank lever $A^4$, pivoted to the frame of the machine. On the horizontal arm of this bell-crank lever is an adjustable or sliding weight $A^5$. The nail-rod passes between these three rolls and the curvature due to its having been coiled on the reel is removed. The pressure of the swinging idler $A^3$ may be increased or diminished, as desired, by moving the sliding weight $A^5$ out or in upon the horizontal arm, and just that degree of pressure obtained which the condition of the nail-rod shall require.

Below the feed-rolls $A'$ $A'$ is the mechanism for severing the blank from the nail-rod. (See Fig. 1 and the enlarged views at Figs. 7, 8, 9, and 10.) Clamped in a suitable yoke is the knife B, forming the stationary part of the cutting apparatus, and clamped in a similar suitable yoke mounted upon a reciprocating carriage $B^2$ is the countering-knife $B'$, constituting the movable portion of the cutter. The carriage $B^2$ is fitted to move in slideways B³, and the same is moved with a to-and-fro movement by means of the pitman B⁴ and eccentric B⁵, the latter receiving its movement from a shaft operated by the gearing of the machine, which shaft and its relation to the other gearing are shown in the drawings and will be understood without description. Mounted in the carriage B² and just beneath the cutter B' is the blank-holder B⁶, which is movable, the same being pressed forward normally by the spring B⁷. The front end of this blank-holder B⁶ is forked or divided into two parts B⁸ B⁸, which parts extend across the path of the nail-rod, leaving an opening through the holder at all times for the nail-rod to pass, so that the blank severed by the knife may pass through this opening and be prevented from slipping to one side or the other or getting out of position. When the carriage moves the knife B' forward, the body of the holder B⁶ comes into contact with the nail-rod, preferably a little in advance of the contact of the moving knife with said rod, and as said knife passes on severing the rod said holder yields on the spring B⁷, remaining in contact until the blank is severed, and when said blank is severed the spring pushes the severed blank over against the wall of the stationary knife-block and holds it there momentarily as the carriage of the movable knife retreats, until finally said holder is released from the blank, permitting the latter to fall into the guideway presently to be described. By this arrangement the blanks are rapidly severed from the nail-rod and pushed into position to pass into said guideway The length of the blank cut from the nail-rod is determined by a fixed stop B⁹, against which the end of the nail-rod strikes as it is fed down. When the end of the nail-rod strikes this stop, the further feeding of it is prevented, the feed-rolls slipping on the rod while the blank is being severed and pushed to one side by the holder, as above described. The moving knife B' will itself prevent the feed-rolls from forcing the rod down until this knife is out of the way. The operation of severing the blank is briefly as follows: The feed-rolls force the nail-rod down until its end comes in contact with the stop B⁹. Then the moving knife comes up and severs the blank from the rod, and the holder, as above described, guides and holds the severed blank and pushes it off from the stop and over the guide-passage, and releasing it permits the blank to fall into said guide-passage. In the meantime the knife has retreated first and then afterward the holder retreats, leaving the way clear for the further feeding of another length of rod down in contact with stop B⁹. It will be noticed that the movement of the holder B⁶ insures that the lower instead of the upper end of the severed blank is always carried over first, so that the tendency to clog which would exist if the upper end fell over first is prevented.

The connection between the eccentric and the knife-carriage is peculiar and designed to prevent lost motion by wear, so that certainty of action in both directions is assured. It will be seen by reference to Fig. 7 that the pitman B⁴ is connected to the rectangular framework by a knuckle-joint B¹⁰. The strap of the eccentric at B¹¹ farthest from the pitman is formed in the arc of a circle struck from the center of the knuckle B¹⁰ and bears against a shoe B¹², struck on the same arc; and it will be noticed by reference to Fig. 11 that the pitman-rod B⁴ is made in two parts or pieces, each of which is screw-threaded, the two pieces being screw-threaded in opposite directions, and a nut B¹³ incloses these two parts, so that by turning said nut in one or the other direction it is lengthened or shortened. By this arrangement the bearings on the eccentric and the connection between the eccentric and the carriage is kept at all times closely set up and free from lost motion and that any lost motion that occurs from wear may be taken up by the nut at any time. Moreover, the eccentric has by this construction a connection with the carriage in both directions, so that said carriage is moved in both directions by a thrust instead of a pull, the thrust in one direction being against the knuckle-joint B¹⁰ and in the other direction against the shoe B¹², the lateral movement or oscillation being accommodated by the knuckle-joint at one end and the curvilinear bearing at the other.

The operation of forming the horse-nail blanks into the required shape is performed by passing the severed blank through a series of roller-dies, each pair of dies containing a matrix of the required form, half of the matrix being in one and half in the other roller of each pair. By this means the blank receives a series of impressions and is brought to the required shape gradually. In the machine illustrated in the drawings I show eight pairs of these dies, and I prefer that each pair of dies shall contain two matrices—that is to say, shall be constructed so that at each complete revolution they will operate upon two successive nail-blanks from the same nail-rod, as this arrangement gives plenty of time, while it also gives suitable size and strength to the dies. In this operation of reducing the severed piece of nail-rod to shape it is necessary that the piece of metal shall be turned a quarter-turn after each impression of the dies in order that the force of the dies shall be applied to the metal first in one direction and then in the other alternately, and as the nail-rod comes from the reel with its flat side parallel to the axis of the reel and is cut by the knives in this position I provide means for turning the severed blank a quarter-turn on its way from the knife to the first pair of die-rolls, as well as between the succeeding pairs.

Referring to Figs. 7, 8, 9, and 12, C is a vertical casing perforated at its upper end with the passage C' of a suitable size to receive the nail-blank, which passage has its greatest width in the same plane as the greatest width of the nail-rod as the same is severed by the knife, while at the lower end of this casing is a passage $C^2$, in which the greatest width lies in a plane at right angles to the passage $C'$. Between these passages $C'$ and $C^2$ is located the turning device, consisting of the short section of tube $C^3$ with a passage through it similar to the passage $C'$ and $C^2$. Upon this turning device or tube is mounted a small pinion $C^4$, which is engaged by a rack $C^5$, connected to the moving knife-carriage $B^2$, so that the knife-carriage in each of its to-and-fro movements causes the tubular turning device $C^3$ to rotate through a quarter-revolution in one direction and return to its former position in the other direction. The operation is as follows: The severed nail-blank falls down through the passage $C'$ and into the turning device, being caught on top of the passage $C^2$, the turning device being now in the position opposite to the one shown in Fig. 8. When the knife-carriage advances again to sever the next blank, the turning device is rotated thereby through the means of the rack and pinion into such position that it coincides in the direction of the width of this passage with the passage $C^2$ below it, and the nail-blank having now received a quarter-turn passes through the passage $C^2$ edgewise to the first pair of die-rolls. This mechanism is duplicated between each succeeding pair of die-rolls, with the exception that instead of the cogged rack $C^5$, which takes its movement from the knife-carriage, a slightly-different mechanism is substituted for said rack. This substituted mechanism will be understood by reference to Figs. 15 and 16. In said figures $C^6$ is a rock-shaft having on it a cogged segment and another arm coming in contact with a cam-plate $C^7$, attached to one of the die-rolls of the pair immediately below the turning device. The continuous rotation of the die-rolls through the means of this cam-plate and segment-carrying lever and the returning spring $C^8$ produces the intermittent quarter-turning to and fro of the turning device, the cogged segment acting on the pinion of the turning device in the same manner as the cogged rack above described. It will be noticed in this connection that the passage-ways and the turning devices are duplicated to accommodate two sets of blanks and that the second or inside turning device placed side by side with the first or outside one receives its motion from the latter by having its pinion engage with the pinion of the latter.

The die-rolls are indicated by the letters $D$ $D'$ and the matrices by the letters $D^2$ $D^2$, there being two series of two matrices on each roll. (See Fig. 16.) In order that the die-rolls $D$ $D'$ may bear together with the desirable accuracy and firmness, I mount the boxes of each pair in the manner shown in Fig. 14, in which $D^3$ is a box-yoke large enough to contain two boxes, one for the journal of each of the rolls.

$D^4$ $D^5$ are two boxes lying side by side in the yoke. The vertical sides of these boxes are formed into a wedge shape, being larger at the front than at the back, and between the yoke and the boxes at each side is a wedge $D^6$, provided with a screw $D^7$, tapped into the yoke for holding the wedge in. Through the yoke and through a slot in the wedge $D^6$ at each side is a draft-screw $D^8$, tapped into the box to clamp and hold it against the wedge, and between the two boxes is a central wedge $D^9$, to be driven into place by blows. Now in adjusting the boxes they may be driven together by the wedges $D^6$, which are to be held in position by the screw $D^7$, and driven apart by the center wedge $D^9$, and held firmly against the wedges $D^6$ by means of the draft-screws $D^8$, so that all slack or shake of the bearings is prevented.

Figure 16:
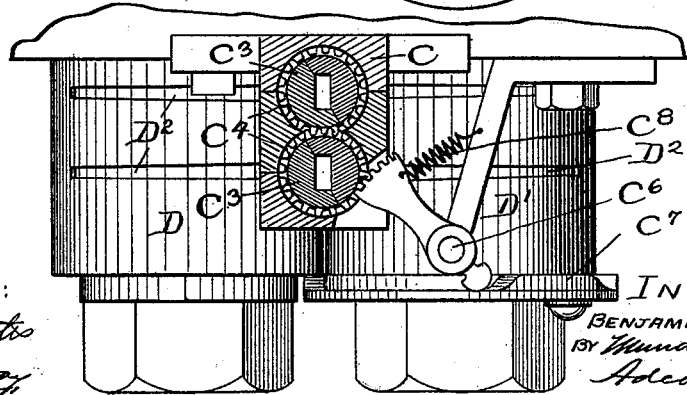
Figure 20:
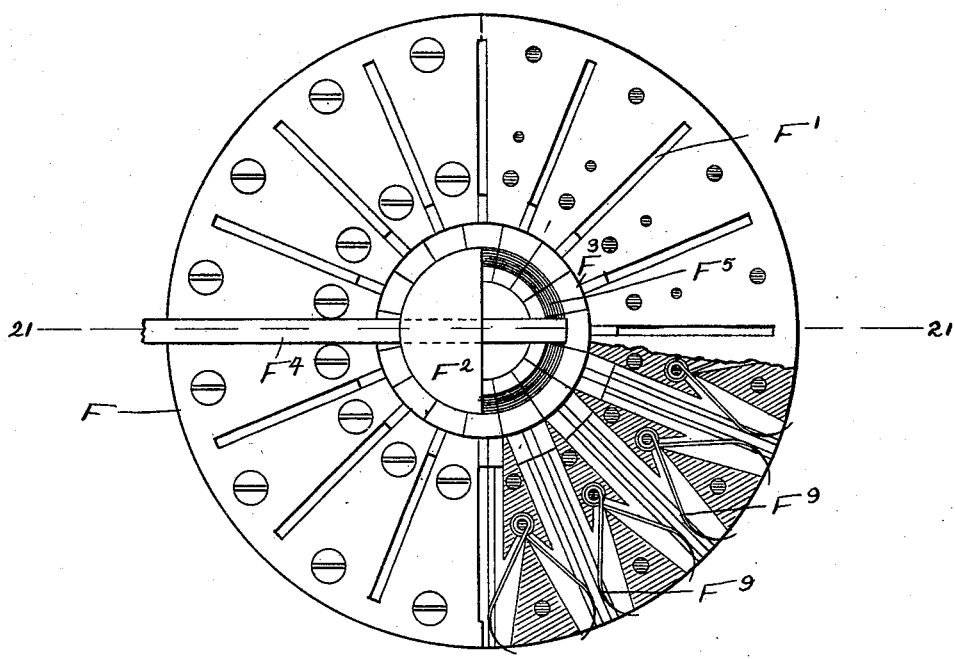
Figure 21:
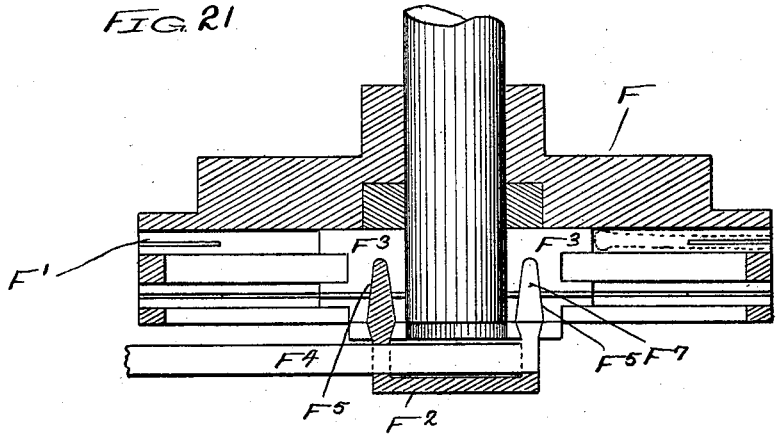

In order to clean out the passages from time to time, as well as to prevent any bad effect from accidental clogging of the same which may take place while the machine is in operation, these guideways or passages are made in two parts throughout their length, and the turning device in each and its pinion is also split lengthwise, the whole being held together by means presently to be described and in such manner that the front part may be removed readily to expose the passage; and the same split arrangement of casing and turning device is duplicated for the inner or fellow passage and its turning device, as will be seen at Fig. 16. These parts are held together when in position by a lever $E$, jointed to the outer part of the casing at $E'$ and fulcrumed in a latch device $E^2$, secured to the frame of the machine. The outer end of the lever $E$ is connected to a rod $E^3$, which in turn is pivoted to a lever $E^4$, and this latter lever to a rod $E^5$, and this rod $E^5$ is in turn connected to the driving clutch mechanism of the machine in such manner that when clogging takes place in any of the passages in such way as to force out or force apart the casing of the passages the rod $E^5$ will be moved thereby and a spring-latch released which will throw the clutch out and stop the machine. $E^6$ is the power-wheel of the machine, and $E^7$ a yoke that moves the clutch connected to the end of the lever $E^8$, to which lever is attached a spring $E^9$, the pull of which tends to throw the clutch out of engagement if said pull is permitted. The lever $E^8$ is connected to a rock-shaft $E^{10}$, which rock-shaft, by means of a lever $E^{11}$ and connecting-rod $E^{12}$ is connected to the starting-lever $E^{13}$. A latch $E^{14}$ engages the lever $E^{11}$ and holds the clutch in position against the spring $E^9$. The said clutch $E^{14}$ is itself held down against the upward pull of the spring $E^{15}$ by means of a wedge enlargement $E^{16}$, carried on the end of the rod $E^5$. When the rod $E^5$ is pulled by the opening of the casing, as above described, the latch $E^{14}$ is released from the lever $E^{11}$, and the spring $E^9$ is then free to throw open the clutch $E^7$ and stop the machine by releasing the power-wheel from its shaft. To start the machine again, it is only necessary to swing the lever $E^{13}$, which being connected with the lever $E^{11}$ the rock-shaft and the lever $E^8$ forces the clutch into engagement against the power of the spring $E^9$, and if the latch $E^{14}$ is set properly the machine will then continue to run. The latch $E^2$ in which the lever E is fulcrumed is so constructed that it may be opened and the lever E entirely removed in order to permit the casing-cover attached thereto to be entirely taken off when required.

The device above described for unshipping the clutch will operate when any one of the several sections of the guide-casing is forced open by clogging and without interfering with the other sections or portions, because the connection between the lever E and the lever $E^3$ is a loose one by a slot and pivot, as will be understood by reference to Fig. 17. This looseness of connection permits the swinging of the shaft on which the levers $E^4$ are mounted through a certain arc, which is sufficient for all purposes without causing any of the levers E to be affected.

After the nail-blank has been acted upon by all of the die-rolls it is discharged into the last section of the guideway or passage, which in the machine shown in the drawings is not provided with any turning device, as a further turning of the nail-blank is unnecessary. The next operation required to completely form the blank is to compress the nail-head between dies with a compression in the direction of the length of the nail in dies which are made solid to avoid the formation of a fin on the nail-head and to give the desirable smooth contour to said head. As the die which is to hold the nail is a solid one, and as the nail is delivered from the roller-dies head first and with the head downward, it is necessary to provide some means for receiving the blank head first and turning it, so that it may be delivered to the heading-dies point first and be passed into the solid heading-die. For this purpose of receiving the nail-blank head first and delivering it point first I provide the turn-plate F, located immediately below the last section of the guideway above described. This turn-plate or rotating receiver, speaking generally, consists of a circular plate provided with a number of radial slots and moving with an intermittent rotary motion, so that each one of the radial slots will be brought in succession and in proper timing beneath the last section of the guideway, so that each of said radial slots will receive a nail-blank which will fall into it from the guideway head first and be carried around to a horizontal position, where a reciprocating pusher operates to push the nail-blank out of the radial slot point first into one of a series of die-blocks, said die-blocks being mounted on a moving chain moving with the same intermittent motion as the turn-table. The chain of die-blocks containing the blanks is carried under a reciprocating die-press, where one or more dies are brought down upon the heads in succession, after which and when the blanks have been carried around to the inverted position they are pushed out of the dies and thus discharged from the machine.

Referring to Figs. 20, 21, 22, 23, 24, 25, 26, 27, 28, and 29, the details of the construction of the turn-plate F will be seen. The plate as a whole is mounted on the end of one of the gear-shafts of the machine, and said plate is cut with a series of radial slots F'. (In the machine illustrated to accommodate the duplication of the feed-passages and matrices on the die-rolls there are actually two series of these passages in the turn-plate.) $F^2$ is a hub or cap intended to hold in place in the radial slots a series of slides $F^3$, one of which is shown detached at Fig. 28, and also to guide a reciprocating push-rod $F^4$. This hub or collar $F^2$ engages the slides $F^3$ in the cavity $F^5$ and prevents said slides from coming out of the radial slots and holds the same in toward the center of the plate. A cavity in the collar marked $F^6$ permits the insertion or assembling of the slides and collar in place and permits the slides to be pushed out into the slot to discharge the nails when any given slide is in proper position to coincide with said cavity, and the end of the push-rod $F^4$ is bent and conformed at $F^7$ to fit the cavity $F^5$ and correspond in outline to the shape of the collar in cross-section, so that said push-rod $F^4$ may engage in turn each of the slides $F^3$ as they are brought successively around by the intermittent rotation of the turn-plate. The intermittent motion is given to the push-rod $F^4$ by means of a cam $F^8$ and a connecting-lever, (see Figs. 5 and 6,) which cam is mounted on one of the shafts of the machine and rotates continuously. $F^9$ (see Figs. 20 and 25) are springs mounted in the turn-plate in such manner as to give a slight friction on the nail-blank while the same is in the radial slot to obviate any tendency of a quick motion to throw the blank out of the slot centrifugally.

G are the solid heading-dies. (See Figs. 5, 30, 31, 32, 38, and 39.) These dies are duplicated to simultaneously accommodate the two sets of nail-blanks and are mounted in series in a chain G', passing over the carrying-wheels $G^2$ $G^3$, between which wheels is located an anvil-block or solid table $G^4$, along the upper surface of which the chain of dies is carried, said table being itself slotted with slots $G^5$ to accommodate the depending shanks of the nails in the passage of the dies across it. It will be noticed that the carrying-wheels $G^2$ $G^3$ are also each similarly slotted to accommodate the shanks of the depending nail-blanks.

$G^6$ is a die-head mounted in slides and reciprocated up and down by a pitman $G^7$, operated by an eccentric $G^8$, similar in construction to the eccentric operating the cutting-dies and above described. This die-head carries the dies $G^9 G^{10}$. The object of having two dies in the die-head is simply in order that the swaging operation on the head may be more gradual—i. e., so that each nail-head will be twice operated upon, each operation being by a die of slightly-different conformation on the principle of gradual shaping—and in cases where peculiar conformation is desired to be given to the head an additional die or dies may be mounted in the die-head $G^6$, such dies being properly spaced to correspond with the countering-dies in the chain below. Attached to the die-head $G^6$ by means of the rod $G^{11}$ is a discharge plate or pusher $G^{12}$, which pusher, having the same reciprocating motion as the die-head $G^6$, comes down upon the ends of the projecting shanks of the nail-blanks when they have been carried around by the movement of the chain and drives the blanks out of the heading-dies, thus discharging them from the machine.

The means employed for imparting to the turn-plate and to the chain of heading-dies the requisite coincident intermittent movement is as follows: Fixed to the turn-plate is a gear H, and fixed to the chain-carrying wheel $G^2$ is a corresponding gear H'. Between the two gears H and H' is an intermediate idler-gear $H^2$, the arrangement being such that any movement given to the wheel $G^2$ is imparted by the gears H', $H^2$, and H to the turn-plate. On the shaft $H^3$, on which the chain-carrying wheel $G^2$ is fixed, is a loose gear-wheel $H^4$, which meshes with the continuously-running gearing of the machine, and carried on this gear-wheel $H^4$ is a spring-pawl $H^5$, pressed inward toward the shaft by a spring $H^6$. (See Figs. 35 and 37.) Connected to the chain-carrying wheel $G^2$ by means of a sleeve $H^7$, which extends from the gear H', is a ratchet $H^8$, and connected to the framework of the machine adjacent to the ratchet and pawl and surrounding the sleeve $H^7$ is a stationary cam-plate $H^9$, secured to the framework by a bolt through the adjusting-slot $H^{10}$. On the periphery of this cam the pawl $H^5$ rides and is held out of contact with the ratchet-teeth at all points, except at the depression $H^{11}$, so that at each revolution of the gear-wheel $H^4$ the pawl $H^5$ will descend in the depression and engage a tooth of the ratchet and carry the ratchet forward one tooth only, riding out of the depression and onto the circular periphery of the cam when this has been accomplished. By this means each revolution of the gear-wheel $H^4$ imparts to the chain-carrying wheel and to the turn-plate a stated portion of a revolution. To prevent wear and shock, the casing which carries the pawl $H^5$ is cushioned at each side by a piece of rubber $H^{12}$. To insure that the stated part revolutions shall be accurate and the chain-carrying wheel held positively at each stop, I key to the shaft $H^3$ an index-wheel $H^{13}$, and above it, secured to the frame of the machine, is a spring-depressed pawl or locking-latch $H^{14}$. Attached to the gear-wheel $H^4$ is a cam $H^{15}$, which at each revolution of said gear-wheel $H^4$ underrides the pawl $H^{14}$ and lifts it out of the notch in the index-wheel, permitting the index-wheel to move with the shaft, which is now being moved by means of the ratchet and pawl previously described. When the cam $H^{15}$ has passed, the latch $H^{14}$ springs again into contact with the index-wheel and rides on said wheel during the further movement of the latter until a notch is reached, and, entering said notch, stops the shaft. To overcome the shock of stopping, I insert between the casing which carries the latch $H^{14}$ and the framework of the machine a rubber cushion $H^{16}$. It will be understood that the number of notches in the index-wheel exactly corresponds to the number of the teeth in the ratchet and also the radial openings in the turn-table, and it will be seen from the drawings at Fig. 34 that between the notches on the index-wheel the periphery of said wheel is inclined slightly ratchet fashion from notch to notch to insure the pawl engaging the notches with certainty.

I claim—

1. In a horse-nail machine of the roller-die type, and having a series of overhung roller-dies, the combination with said roller-dies constructed with a multiple series of matrices, of means for feeding into the machine several strips of nail-rod, multiple nail-blank passages extending to and connecting the successive pairs of rolls, and multiple sets of turning devices for giving the blank a quarter-turn on its way to the dies, one set for each passage, one set of turning devices operating the other, a turn-plate having two sets of radial passages and a pushing device for operating in both sets simultaneously for turning and delivering the nails, substantially as specified.

2. In a horse-nail machine of the roller-die type, and having a series of overhung roller-dies, the combination with said roller-dies constructed with a multiple series of matrices, of means for feeding into the machine several strips of nail-rod, multiple nail-blank passages extending to and connecting the successive pairs of rolls, and multiple sets of turning devices for giving the blank a quarter-turn on its way to the dies, one set for each passage, one set of turning devices operating the other, a turn-plate having two sets of radial passages and a pushing device for operating in both sets simultaneously for turning and delivering the nails to a duplicate heading-die mechanism, and said duplicate heading-die mechanism, substantially as specified.

3. In a horse-nail machine of the roller-die type, the combination with the series of die-rolls, of a turn-plate and pushing device for receiving the nails head first and delivering them shank first to a heading-die mechanism, said heading-die mechanism consisting of a series of solid dies mounted in a chain and passing over wheels, slotted to accommodate the depending shanks of the nails, a slotted anvil between the chain-wheels and a countering die or dies above the anvil, substantially as specified.

4. In a horse-nail machine of the roller-die type, the combination with the series of die-rolls, of a turn-plate and pushing device for receiving the nails head first and delivering them shank first to a heading-die mechanism, said heading-die mechanism consisting of a series of solid dies mounted in a chain and passing over wheels, slotted to accommodate the depending shanks of the nails, a slotted anvil between the chain-wheels and a countering die or dies above the anvil, said countering-die having a reciprocating motion and mounted in a head to which is connected a nail-discharging pusher placed between the chain-carrying wheels and operating to push the nails in the chain out of the same to discharge them from the machine, substantially as specified.

5. The mechanism for conveying a nail-blank to forming-dies and giving said blank a quarter-turn on its way, consisting of a tubular guideway a portion of which is mounted to revolve, and means for giving said portion a part revolution, said means consisting of a pinion mounted on said revoluble portion, and a cogged segment actuated by a cam mounted on one of the roller-die shafts, substantially as specified.

6. The mechanism for feeding several nail-blanks to roller-dies having duplicated matrices, consisting of duplicated guideways, each containing a revoluble portion, and each guideway being formed in two separable parts including said revoluble portion, and means for holding said guideways together when in operation, whereby facility for opening, cleaning and removing clogged nail-blanks is afforded, substantially as specified.

7. The mechanism for feeding several nail-blanks to roller-dies having duplicated matrices, consisting of duplicated guideways, each containing a revoluble portion, and each guideway being formed in two separable parts including said revoluble portion, and means for holding said guideways together when in operation, whereby facility for opening, cleaning and removing clogged nail-blanks is afforded, said means for holding all of said portions together being connected by intermediate parts with a latch or device for operating a clutch to stop the machine, substantially as specified.

8. In a horse-nail machine, the device for straightening the nail-rods, consisting of three idle-rolls, the middle one of which is mounted upon one arm of a bell-crank lever the other arm of which is provided with a sliding adjustable weight, substantially as specified.

9. The adjustable bearing-boxes for the roller-die shafts, consisting of two boxes having wedge-shaped sides, in combination with adjustable wedges, a yoke surrounding the whole, and draw-bolts for clamping the boxes to the yokes, substantially as specified.

10. The means for operating the knife-carriage and keeping the same free from lost motion by wear, consisting of an eccentric, a pitman therefor made adjustable as to length and pivoted to said carriage, a shoe on the carriage made in the form of an arc struck from the center of the pitman-pivot, and a bearing on the eccentric-strap setting against said shoe, substantially as specified.

11. The means for severing blanks from the nail-rod and delivering the severed blanks to a feed-passage, consisting of a stationary cutter with a stop at a suitable distance beneath it, a movable knife mounted on a carriage which reciprocates to and fro, and a yielding blank-holder mounted on said carriage to come in contact with the blank while the same is being severed, holding said blank and pushing it over the feed-passage while the movable cutter retreats and then releasing said blank to drop into the guideway, substantially as specified.

12. The means for severing blanks from the nail-rod and delivering the severed blanks to a feed-passage, consisting of a stationary cutter with a stop at a suitable distance beneath it, a movable knife mounted on a carriage which reciprocates to and fro, and a yielding blank-holder mounted on said carriage to come in contact with the blank while the same is being severed, holding said blank and pushing it over the feed-passage while the movable cutter retreats and then releasing said blank to drop into the guideway, said yielding blank-holder being slotted or forked at the end to surround the severed blank, substantially as specified.

13. The mechanism for receiving the blanks from the roller-dies head first and delivering the same shank first to the heading-dies, consisting of a turn-plate provided with radial slots, each of which has at its inner end a slide held in position in the turn-plate, in combination with a push-rod operated intermittently in time with the intermittent rotation of the turn-plate to push said slides toward the periphery of the turn-plate successively, substantially as specified.

14. The mechanism for receiving the blanks from the roller-dies head first and delivering the same shank first to the heading-dies, consisting of a turn-plate provided with radial slots, each of which has at its inner end a slide held in position in the turn-plate, in combination with a push-rod operated intermittently in time with the intermittent rotation of the turn-plate to push said slides toward the periphery of the turn-plate successively, the means for holding the slides in place consisting of a collar engaging cavities in said slides, perforated to permit the passage of the push-rod and slides, substantially as specified.

15. The turn-plate F, provided with two series of radial slots and a single series of slides operating in both series of slots, said slides being held by a single collar perforated to permit their passage, and a push-rod, all in combination, substantially as specified, whereby means is afforded for receiving simultaneously two nail-blanks head first, and delivering the same shank first to heading-dies, substantially as set forth.

16. The device for receiving nail-blanks head first and delivering the same shank first, consisting of the combination of an intermittently-rotating plate provided with radial slots, a slide in each of said slots, a collar engaging each of the slides and being slotted at one point for the passage of a single slide at a time, and a reciprocating pusher timed to move with the plate and engaging the slides successively to push the same out and return the same toward the center of the plate, substantially as specified.

17. The combination with two carrying-wheels, an endless chain of dies, an anvil between the wheels and in contact with the chain of dies and a reciprocating die opposing the anvil, substantially as specified.

18. The combination with the endless chain of dies, of means for moving the same intermittently, an anvil in contact with the chain and a countering-die opposing the anvil, substantially as specified.

19. The combination of the endless chain of dies, each consisting of a solid block with a hole through it adapted to receive a nail-blank, the carrying-wheels moving with a step-by-step rotation and slotted to accommodate the nail-shanks, an anvil in contact with the chain between the wheels, said anvil being also slotted to accommodate the nail-shanks, and an opposing reciprocating die, substantially as specified.

20. The endless chain of perforated dies, in combination with the anvil, the carrying-wheels, the reciprocating die operating upon one ply of the chain, and the push-out rod connected to the head of said reciprocating die and operating upon the other ply of said chain, substantially as specified.

21. The combination with the roller-dies and mechanism for forming the nail-blanks, of the turn-plate for receiving said blanks head first and delivering them shank first to the heading-dies, the endless chain of heading-dies, the anvil and the reciprocating heading-die, substantially as specified.

22. The combination of the endless chain of heading-dies, the anvil and two or more reciprocating heading-dies one following the other in its action upon the dies of the chain or their contents, substantially as specified.

23. In combination with the roller-die mechanism constructed to operate simultaneously upon two or more nail-blanks, the turn-plate constructed to receive and deliver simultaneously two or more nail-blanks, and the endless chain of dies, said chain consisting of two or more series of dies placed side by side, the chain carrying the wheels, the anvil and the reciprocating die-head opposing said anvil and carrying two or more die-heads side by side, substantially as specified.

24. The mechanism for imparting a step-by-step rotary motion to the chain-carrying wheels, and the turn-plate F geared thereto, which consists of a loose gear-wheel carried on a shaft and bearing a spring-pawl, a ratchet connected to the wheel to be actuated, a stationary cam on which the pawl rides and containing a depression which permits the pawl to engage one tooth at each revolution, a notched index-plate locked to said shaft, a stationary spring-latch for engaging said notches, and a cam on the gear-wheel for engaging and lifting said latch, substantially as specified.

25. The mechanism for imparting a step-by-step rotary motion to the chain-carrying wheels, and the turn-plate F geared thereto, which consists of a loose gear-wheel carried on a shaft and bearing a spring-pawl, a ratchet connected to the wheel to be actuated, a stationary cam on which the pawl rides and containing a depression which permits the pawl to engage one tooth at each revolution, a notched index-plate locked to said shaft, a stationary spring-latch for engaging said notches, a cam on the gear-wheel for engaging and lifting said latch, the housings for said pawl and said latch being cushioned with an elastic cushion, substantially as specified.

BENJAMIN JUDD ABBOTT.

Witnesses:
H. M. MUNDAY,
S. E. CURTIS.